United States Patent [19]

Stitzer et al.

[11] 4,262,847

[45] Apr. 21, 1981

[54] URETHANE FOAM GUN

[75] Inventors: Phillip L. Stitzer, Cochranville, Pa.; Stephen A. Deutsch, Greenwich, Conn.

[73] Assignee: Witco Chemical Corporation, New York, N.Y.

[21] Appl. No.: 249

[22] Filed: Jan. 2, 1979

[51] Int. Cl.³ .............................................. B05B 7/02
[52] U.S. Cl. .................................... 239/112; 239/414; 239/432; 239/527
[58] Field of Search ................ 222/136, 195; 239/112, 239/113, 414, 415, 432, 526, 527

[56] References Cited

U.S. PATENT DOCUMENTS

| 1,661,150 | 2/1928 | Birkenmaier | 239/415 X |
| 3,042,311 | 7/1962 | Edwards et al. | 239/112 X |
| 3,240,432 | 3/1966 | Boettler | 239/112 X |
| 3,298,612 | 1/1967 | Torrens | 239/432 X |
| 3,690,557 | 9/1972 | Higgins | 239/112 |
| 3,900,163 | 8/1975 | Volker | 239/414 X |
| 4,117,551 | 9/1978 | Brooks et al. | 239/414 X |

Primary Examiner—Richard A. Schacher
Attorney, Agent, or Firm—Albert L. Gazzola; Morton Friedman

[57] ABSTRACT

A urethane foam gun is disclosed in which polyisocyanate and polyol feed streams are mixed with air under pressure within the gun with vigorous intermixing in the outlet nozzle to a condition ready for application. Once applied the foam polymerizes in place. The gun is formed with an integral block design in which dual plug valves are mounted for control of the streams. Actuation is achieved by a trigger valve mounted on the gun, and a second gun-mounted valve controls a solvent flush for cleaning to avoid polymerization within the gun itself. The gun is useful for foam-in-place applications, such as protective packaging.

11 Claims, 8 Drawing Figures

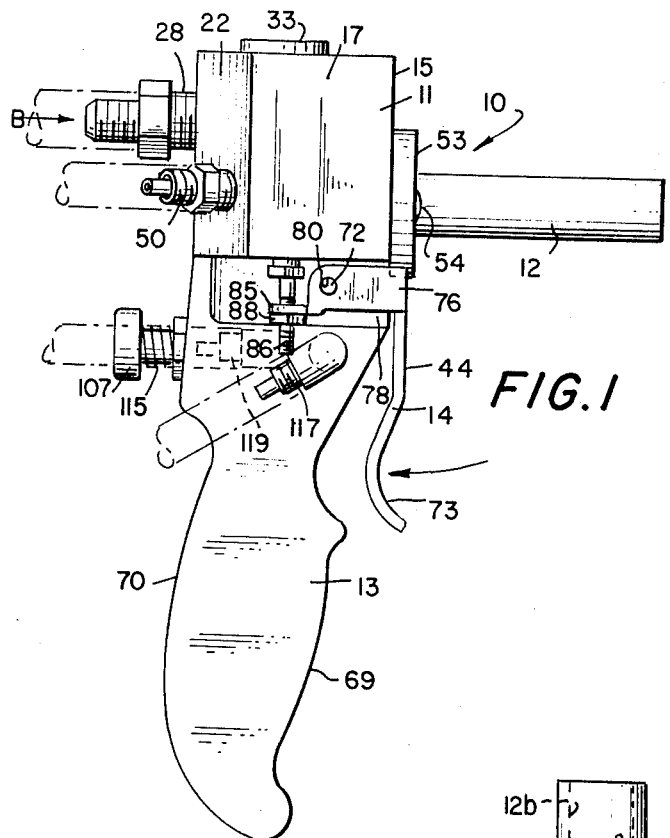
FIG. 1
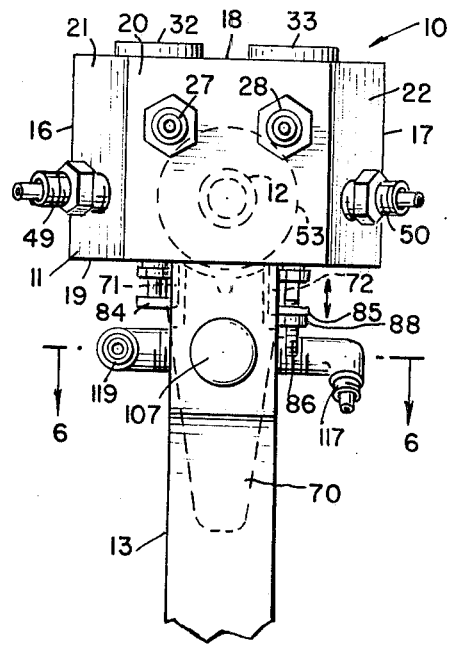
FIG. 2
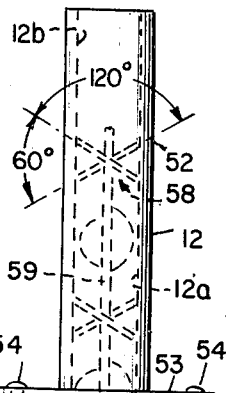
FIG. 3
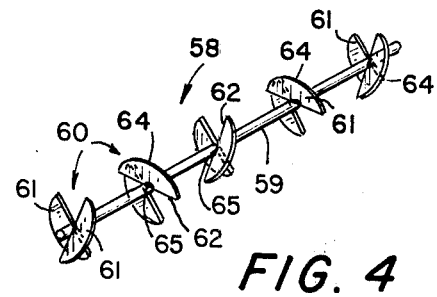
FIG. 4
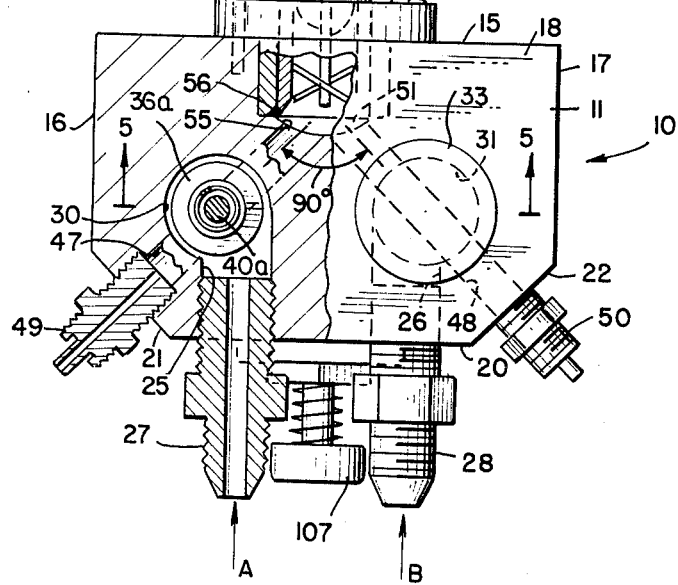

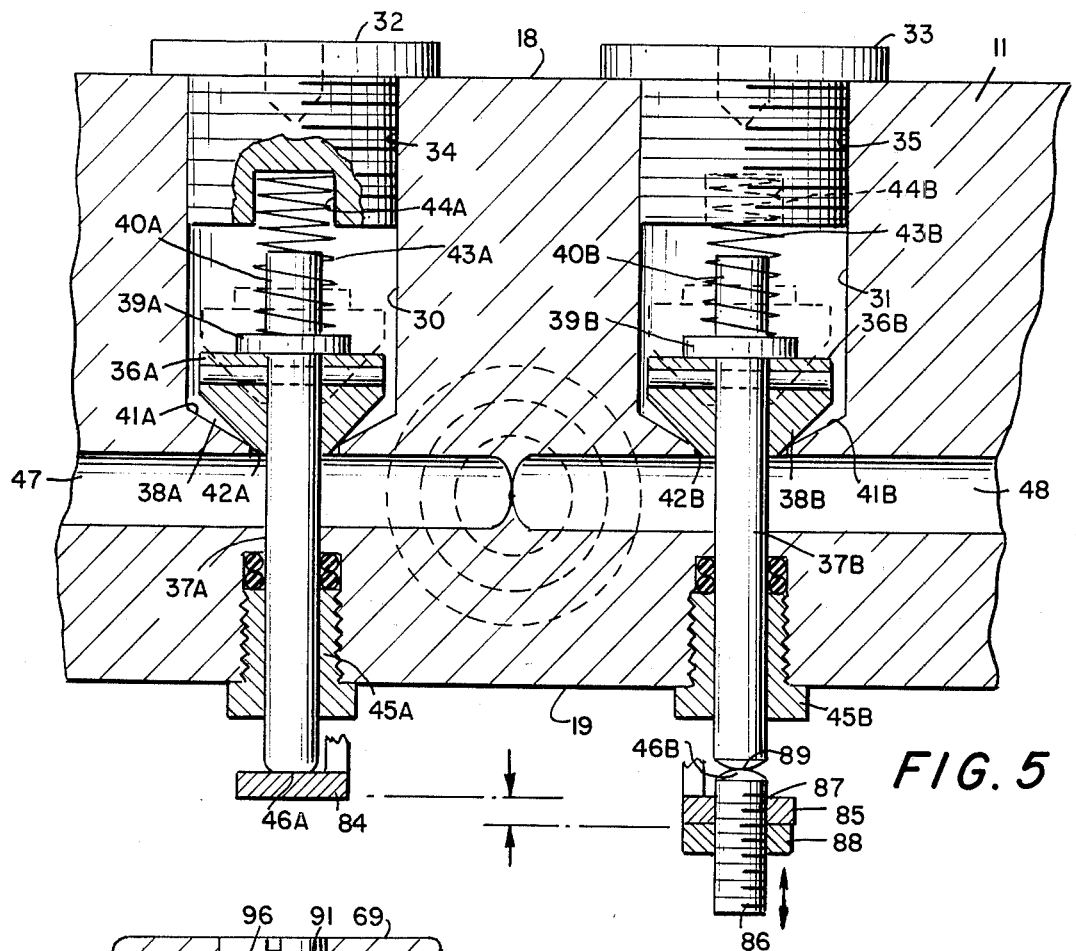
FIG. 5
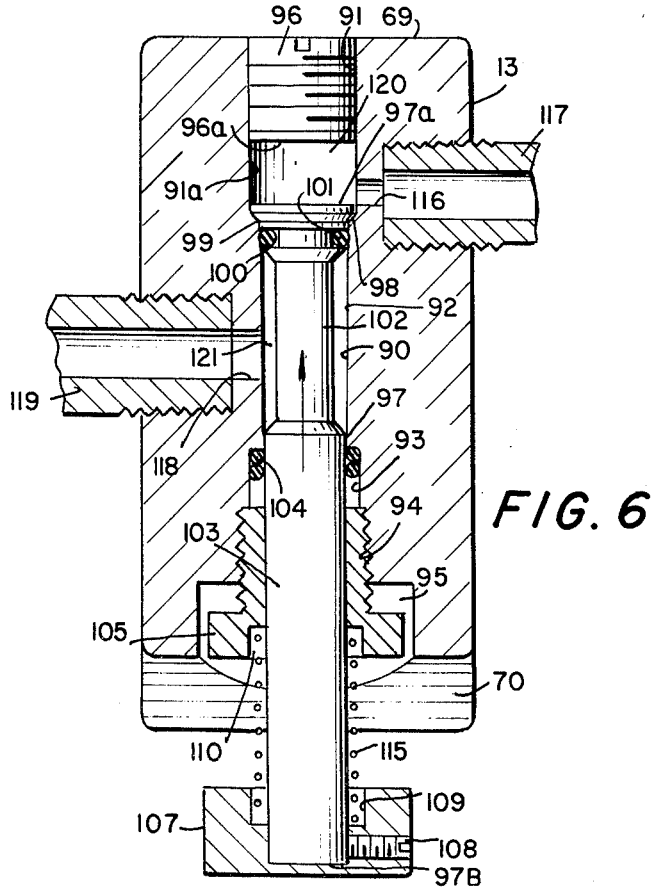
FIG. 6
FIG. 7

URETHANE FOAM GUN

FIELD OF THE INVENTION

This invention relates to a foam gun. Specifically this invention relates to mixing and supplying polyurethane foam with a gun.

BACKGROUND AND DISCUSSION OF THE PRIOR ART

In the use of conventional polyurethane foam providing apparatus, the foam constituents, namely polyisocyanate and polyol, were brought together in a mixing head wherein they were then projected into a suitable mold. Prior art mixing heads such as disclosed in Reichert, U.S. Pat. No. 3,306,540, granted Feb. 28, 1967, and Hansen et al, U.S. Pat. No. 3,111,389, granted Nov. 19, 1963, were of heavy duty construction which generally required stationary support structures.

It was desired in the prior art to provide a foam gun which could be hand-held. Hand-held guns were common with fluid sprays such as shown in New, U.S. Pat. No. 3,318,535, granted May 9, 1967. However, the design of polymerizable polyurethane foam guns provided difficulties not encountered in conventional spray guns, in that the foam was unusually laminar in flow and would also tend to polymerize within the gun structure. Diverse and unwieldy piping, valving, and mixing elements were generally required, which precluded practical hand gun designs. Complex construction such as shown in Armeniades et al, U.S. Pat. No. 3,286,992, granted Nov. 27, 1966, were often necessarily used for mixing viscous resins.

One approach to a form gun design was to use a high pressure (i.e. up to 800 psi) air actuated rod that retracts to uncover opposing polyioscyanate and polyol feeds, wereby the air agitates the opposing feed streams. Such devices required extremely high pressures, with disruptive flow patterns, and were generally difficult and costly to manufacture, operate and maintain.

Now there is provided by the present invention a foam gun which is of simplified, positive acting construction.

It is therefore a principal object of this invention to provide an improved foam gun, particularly useful for polyurethane foams.

It is another object of this invention to provide a polyurethane foam gun of simplified construction which is readily manufactured and operated.

It is a further object of this invention to provide a polyurethane foam gun in which there is improved flow pattern and mixing with moderate fluid pressure requirements.

It is a further object of this invention to provide a polyurethane foam gun which may be readily flushed to avoid ingun polymerization.

It is a further object of this invention to provide a polyurethane foam gun wherein the operating mechanisms are mounted on the gun itself.

It is a further object of this invention to provide a polyurethane foam gun with improved nozzle mixing.

It is a further object of this invention to provide a polyurethane foam gun which is readily fabricated of molded piece construction.

It is a further object of this invention to provide a polyurethane foam gun which is practical in design, light-weight, and yet safe and practical in use.

The aforesaid as well as other objects and advantages apparent from the reading of the following description, the adjoined claims and the drawings in which:

FIG. 1 is a right side elevational view of the gun;
FIG. 2 is a partial rear elevational view of the gun;
FIG. 3 is a top plan view of the gun with a partial broken away view;
FIG. 4 is a perspective view of the mixing baffle in the gun nozzle;
FIG. 5 is an enlarged sectional view taken along line 5—5 of FIG. 3;
FIG. 6 is an enlarged sectional view taken along line 6—6 of FIG. 2;
FIG. 7 is a detailed view of the gun trigger; and
FIG. 8 is a schematic illustration of the material flow system for the gun.

DESCRIPTION OF THE PREFERRED EMBODIMENT

Figure 8:
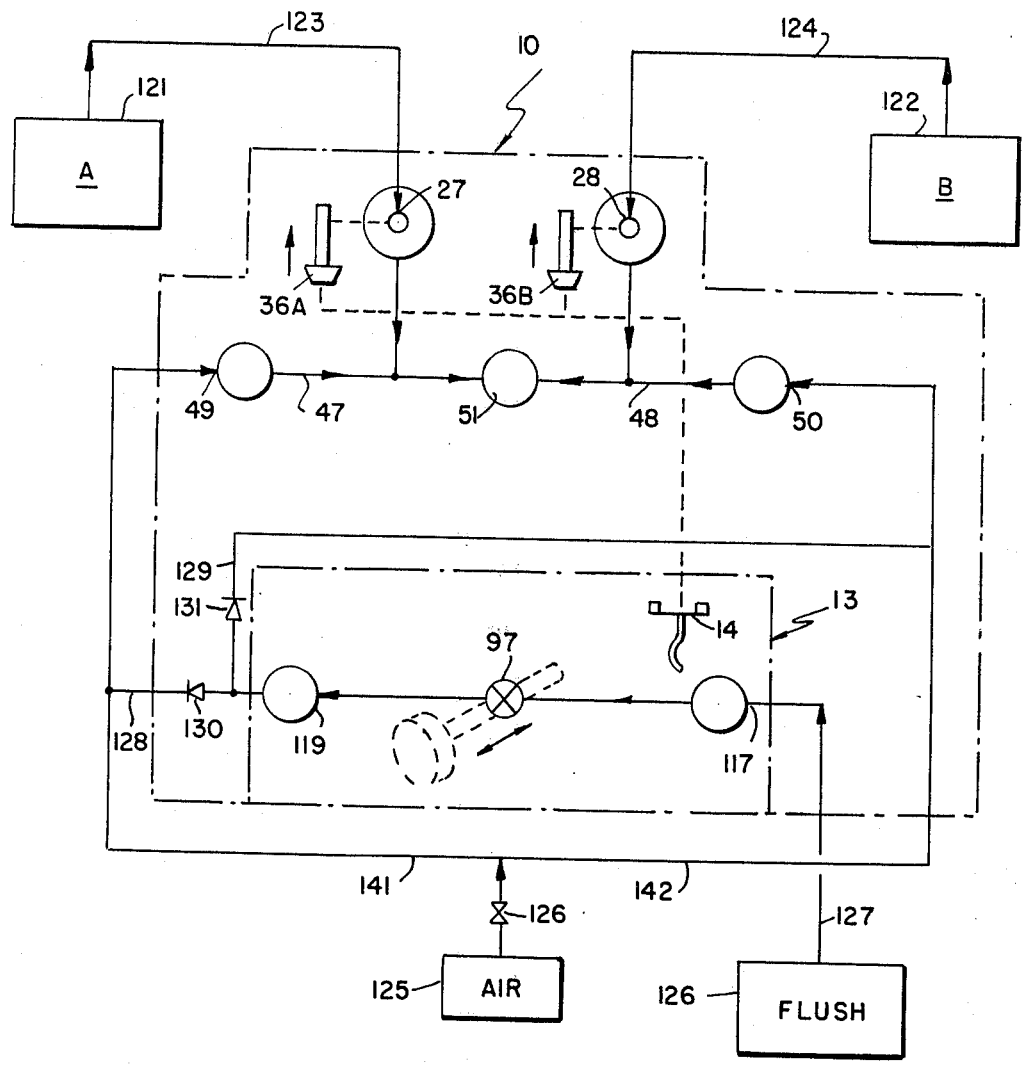

Referring to FIGS. 1-3 there is shown the polyurethane foam gun of the present invention generally referred to by numeral 10. Gun 10 comprises four basic assemblies, to wit, block 11, nozzle 12, hand grip 13 and trigger 14. Nozzle 12 extends outwardly from block 11 to which it is mounted, and hand grip 13 extends downwardly from block 11 to which it is mounted, while trigger 14 is cooperatively movably mounted with respect to both grip 13 and block 11.

Block 11 is a molded metal block with a plurality of intersecting bores therein which serve as fluid conduits. Block 11 is formed with a front 15, oppositely disposed sides 16 and 17, oppositely disposed top and bottom, 18 and 19, respectively, and three rear surfaces 20, 21 and 22. Surfaces 21 and 22 are disposed at 45° with respect to surface 20, for purposes hereinafter appearing. Block 11 is formed with parallel bores 25 and 26 in rear surface 20. Bores 25 and 26 are threaded so as to receive inlet nozzles 27 and 28, respectively which inlets are for liquid components A and B respectively; A and B being urethane components such as polyisocyanate and polyol. Horizontally disposed bores 25 and 26 communicate with vertically disposed bores 30 and 31, respectively, which are larger than bores 25 and 26. The axes of bores 25 and 26 are offset from the axes of 30 and 31 so that a trangential flow action is provided to A and B as they pass from the horizon inlet bores 25 and 26 to the vertical bores 30 and 31. A pair of end caps 32 and 33 are disposed at top 18, and are screwed into screw threaded portions 34 and 35 of the vertical bores (FIG. 5).

A pair of plug valves 36A and 36B are axially disposed in bores 30 and 31. Valves 36A and 36B are formed with depending valve stems 37A and 37B; fustro-conical Teflon plugs 38A, 38B; collars 39A, 39B; and upwardly extending stems 40A, 40B. Bores 36A and 36B are formed with bottom tapered seats as portions 41A, 41B for receiving the sides of the Teflon plugs at ports 42A and 42B. Load springs 43A and 43B are disposed between plug recesses 44A, 44B and collars 39A, 39B so that the valves are spring-loaded closed to seat at ports 42A and 42B. Stems 37A, 37B depend downwardly through bushings 45A, 45B so that stem end portions 46A, 46B extend downwardly below the bottom 19 of block 11, for purposes hereinafter appearing.

Block 11 is also formed with bores 47 and 48 which communicate with surfaces 21 and 22, whereat, nozzles 49 and 50 are mounted, which serve as inlets for air in the foam mode, or as flush/air inlets in the cleaning mode. Bores 47 and 48 are uniquely designed to converge at 90° at outlet orifice 51, and also communicate with bores 30 and 31 with the lifting of valves 36A and 36B from ports 42A and 42B. With the valve lifting foam constituents are forced by the air to converge at the outlet orifice.

In this matter of construction, air under pressure entering nozzle 49, passes through bore 47 to mix with components A from bore 30 while at the same time air under pressure enters nozzle 50 through bore 48 to mix with component B from bore 31. The separate air component streams then converge at 90° at outlet orifice 51 where further mixing occurs in the nozzle 12.

Nozzle 12 comprises a tube 52 fixedly mounted into collar 53 which is in turn mounted to surface 15 by bolts 54 (typical). Tube 52 is formed with a tapered rearward edge 56 which mates with spherical recess 55 of outlet orifice 51. Tube 52 is also formed inside tube surfaces 12a and 12b, with 12a being greater than 12b.

One important aspect to the present invention is the baffle 58 construction best shown in FIGS. 3 and 4. Baffle 58 is formed of a rod 59 to which are welded units or pairs 60 of chord-shaped metal elements 61, at spaced locations along the rod 59. The elements are formed with sharp straight edges 62, which edges intersect at complementary angles of 60° and 120°. Welds 65 fixed the elements 61 to the rod 59. Each unit 60 is also oriented 90° in relation to the next adjacent unit. The rounded portions 64 of the elements contact the inside 12a of tube 52 but extend radially further than 12b so as to be prevented from exiting the front of the tube by the thrust of foam under pressure. It has been found that this configuration and arrangement of elements, particularly the sharp edges 62 provides a high degree of mixing to the viscous laminar flow polyurethane foam. This nozzle mixing provides and insures that components A and B are fully intermixed so that the polymerization reaction is complete throughout the foam structure.

Referring now to FIGS. 1, 2, 6 and 7 there is shown hand grip 13 of cast metal, formed so as to be finger-gripped at surface 69 with the thumb disposed at surface 70. A pair of outwardly disposed coaxial pin ends 71 and 72 are fixedly mounted on the grip. Trigger 14 is formed with a forwardly extending curved position 73 which can conviently be engaged by the index finger. Portion 73 extends into upright position portion 74 which in turn has right-angled flanges 75 and 76 extending therefrom to form a saddle 77 fitting over recessed portion 78 of grip 13. Flanges 75 and 76 are formed with holes 79 and 80, for slidably engaging pin ends 71 and 72, so that trigger 14 pivots about the pin ends when the index finger depresses portion 73. A pair of wing portions 84 and 85 extend horizontally outwardly from flanges 75 and 76 respectively. Wing portion 85, unlike wing portion 84, is formed with a threaded vertically disposed hole 87 to receive screw pin 86 which is adjustably positioned in hole 87 by lock nut 88. Top end 89 of pin 86 abuts the end 46B of valve stem 37B (FIG. 5).

In this manner of construction the user holds the grip 13 and selectively depresses trigger 14 at portion 73 so that trigger 14 rotates on pin ends 71 and 72 causing wing 84 and wing 85 with pin end 89, to press upwardly against valve stem ends 46A and 46B, respectively. The valves being spring-loaded exert a counter-force downwardly so that upon release of the trigger the valve plugs seat in the ports. With this trigger movement the valve are electively actuated. One novel modification is that by screw pin 86 adjustment, the 37B stem actuation may be retarded or advanced in comparison with the 37A stem, and with a specific 38B valve plug profile, the proportion of A and B components may be varied so as to adjust the reactive components where desired, bearing in mind that this adjustment takes place by adjustment on the grip itself, and not at a remote location.

Another aspect to the present invention is that a flush system is operable with and from the handle grip 13 itself. Referring to FIG. 6, there is shown a through bore 90 passing from the front 69 of the handle to the back 70 of the handle. Bore 90 comprises threaded section 91, section 91a, fluid mid-portion 92, seal section 93, threaded section 94, and rear recess 95. An end plug 96 is securely threaded in section 91. A valve shaft 97 is slidably disposed in bore 90, whereby shaft ends 97a moves from the position of FIG. 6 forwardly to abut end 96a of plug 96. Shaft 97 is formed with lip 98 seated in counterbore 99; neck 100 with O-ring seated thereon; fluid shaft section 102; and drive shaft section 103 with O-ring seals 104 (typical). A bushing 105 is threaded in 94 and slidably receives shaft section 103. Knob 107 is secured to rear end 97b of shaft 97 by set screw 108. Knob 107 is formed with recess 109 which is facedly disposed to recess 110 of bushing 105. A compression spring 115 is seated in and between recesses 110 and 109.

Grip 13 is also formed with a first transverse bore 116 with fluid nozzle 117 therein, and a second transverse bore 118, with fluid nozzle 119 therein. Bore 116 is more forwardly disposed on the grip than bore 118. As shown in FIG. 6, bore 116 communicates with cavity 120 formed between plug end 96a and shaft end 97a, while bore 118 communicates with annular cavity 121 formed between shaft section 102 and bore portion 92. In FIG. 6 bores 116 and 118 are not in fluid communication with each other because of O-ring seal 101. However, if and when the user depresses knob 107 (arrow direction), spring 115 compresses, and shaft 97 is moved forward, and with such movment, bore 116 communicates with an annular cavity formed in 120 between shaft section 102 and bore surface 91a, which annular cavity is also in communication with bore 118 such that there is fluid communication from bore 116 to bore 118. A solvent flush feed system, as further described, is attached to inlet nozzle 117 which selectively communicates with outlet nozzle 114 with the shaft actuation as described. Nozzle 119 in turn is connected to air inlet nozzles 49 and 50, so that an air flush is provided to block 11 for cleaning the block.

The flush system as well as the overall fluid flow system of the gun is best illustrated in FIG. 8. With specific reference to FIG. 8, there is schematically shown the confines of gun 10 by the broken line perimeter, with grip 13 in the smaller broken line perimeter. Component A supply drum 121, and component B supply drums 122 may be at a spaced location from where the gun is used. A feed line 123 provides communications from drum 121 to component A inlet nozzle 27, and feed line 124 provides communication from drum 122 to component B inlet nozzle 28.

Components A and B are selectively permitted to flow to bores 47 and 48 respectively from valves 36A and 40 as actuated by trigger 14, and then pass through outlet orifice 51. Air under pressure of about 40 psi is provided from tank 125 through main valve 126 and through the lines 141 and 142 to inlet nozzles 49 and 50, where the air enters block 11 and provides the motive forced to the A and B mixing action, as previously described.

Flush or solvent is supplied by drum 126 through feed line 127 to inlet nozzle 117 and then by selective action of valve shaft 97 there is communication to outlet nozzle 119 and then to tubing 128, 129, check valves 130, 131 and then to air inlets 49 and 50 respectively. Tubing 128, 129 and valves 130, 131 interconnect grip 13 to block 11 but such tubing is not shown in FIGS. 1-7. Thus a flush may be selectively provided to the gun block to clean the block. In this cleaning operation, air under pressure moves the flush from the supply drum 126, through the grip 13, tubing 128 and 129 to bores 47 and 48 and then out outlet orifice 51, and finally through discharge nozzle 12 for application. In this fluid flow system the critical valve port surfaces 42A and 42B (FIG. 5) are flush cleaned, and all possible surface were A and B could polymerize within the block 11 are flushed. The flush could of course be a solvent for the foam whereby a solvating action would take place.

It is to be noted that during the flush cycle, trigger 14 is not depressed, as no possible polymerization would take place upstream of valve seats 42A and 42B.

While the air supply pressure is only about 30 to 50 psi and preferrably about 40 psi, it has been found that the present design provides a nucleating action to the liquid components undergoing mixing. Air flow is provided in about as 15:1 air to liquid ratio, and the specialized baffle while only about 2½ inches in length provides the necessary mixing characteristics.

The block design of the present invention is particularly suited to one-piece molded construction and advantageously may be molded of plastic material including the thermoset resins in particular.

It is also to be noted that the Teflon plug profile and the metal block seat faces are differently angled so that the Teflon plugs seat positively around the entire ports. Leakage is minimized insofar as the potential leakage is on the low pressure side of the valve.

While it has been found that the A and B components be optimumly at converging angles of 90°, as opposed to the prior art 180°, such mixing angle may be varied somewhat such as between 75° and 120°.

From the foregoing, it will be seen that this invention is one well adapted to attain all of the ends and objects hereinabove set forth, together with the other advantages which are obvious and which are inherent to the apparatus and structure.

It will be understood that certains features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A foam gun comprising a body member being formed with first conduit means for a first component and second conduit means for a second component, air conduit means for supplying air under pressure, said air conduit means comprising first and second air conduits in communication with an outlet orifice for each air conduit; and said first and second valves operatively mounted in said first and second component conduit means respectively for selective communication of said first and second component conduit means with a respective air conduit means, a hand grip mounted with said block, and a trigger mounted with the hand grip and operatively associated with the valves, whereby pressing the trigger selectively actuates said valves so as to permit communication between said respective air conduits and said first and second fluid component conduit means, said air conduits converging at said outlet orifice, so that said components are individually air mixed and then air transported to said outlet orifice, wherein the axes of said first and second conduit means are parallel to each other and respectively intersect said first and second air conduits at about 90°, and wherein the axes of said air conduits intersect each other at about 90°.

2. The foam gun of claim 1, said body member being a block and all said conduit means being bores formed in said block.

3. The foam gun of claim 1, wherein said first and second air conduit converge at an angle of about 90°.

4. The foam gun of claim 1, wherein said valves are spring-loaded plug valves.

5. The foam gun of claim 1, said hand grip comprising valve means to provide a flush to said air conduit means.

6. The foam gun of claim 5, said flush valve means being disposed so as to be operated by the user with the same hand for pressing the trigger.

7. The foam gun of claim 6, further comprising a flush conduit disposed in said grip and communicating wih said flush valve, and interconnect said grip with the flush conduit means so that said flush selectively passes through said grip to said air conduit means with flush valve actuation.

8. A foam gun comprising a body comprising means to combine at least two components with a gas and an outlet nozzle extending from said body for dispensing said foam; a baffle disposed in said nozzle to mix said components and gas so as to form a foam, said baffle comprising a plurality of spaced units each unit thereof comprising opposed edged surfaces angularly disposed to each other, wherein each unit comprises a pair of chordal plates wherein the straight portions thereof comprises said edges, wherein adjacent units are angularly disposed with respect to each other so that the edges of adjacent units are angularly disposed.

9. The foam gun of claim 8, wherein the edged surfaces of each unit are disposed at complementary angles of about 60° and 120°.

10. The foam gun of claim 8, said baffle comprising an axially disposed rod, and each unit being bonded to said rod at spaced locations.

11. A foam gun comprising a body member being formed as a block having first conduit means for a first component and second conduit means for a second component, air conduit means for supplying air under pressure, said air conduit means comprising first and second air conduits in communication with an outlet orifice for each air conduit; and said first and second valves operatively mounted in said first and second component conduit means respectively for selective communication of said first and second component conduit means with a respective air conduit; a hand grip mounted with said block, and a trigger mounted with the hand grip and operatively associated with the valves, whereby pressing the trigger selectively actuates said valves, so as to permit communication between said respective air conduits and said first and second component conduit means, said air conduits converging at said outlet orifice, so that said components are individually air mixed and then air transported to said outlet orifice, and wherein the axes of said air conduits and the axis of said outlet orifice lie in a common plane, so that the air mixed components are directly transferred from the respective valves to the outlet orifice for mixing.

* * * * *